No. 706,604. Patented Aug. 12, 1902.
E. SHAY.
LOCOMOTIVE TRUCK.
(Application filed Apr. 8, 1902.)
(No Model.)
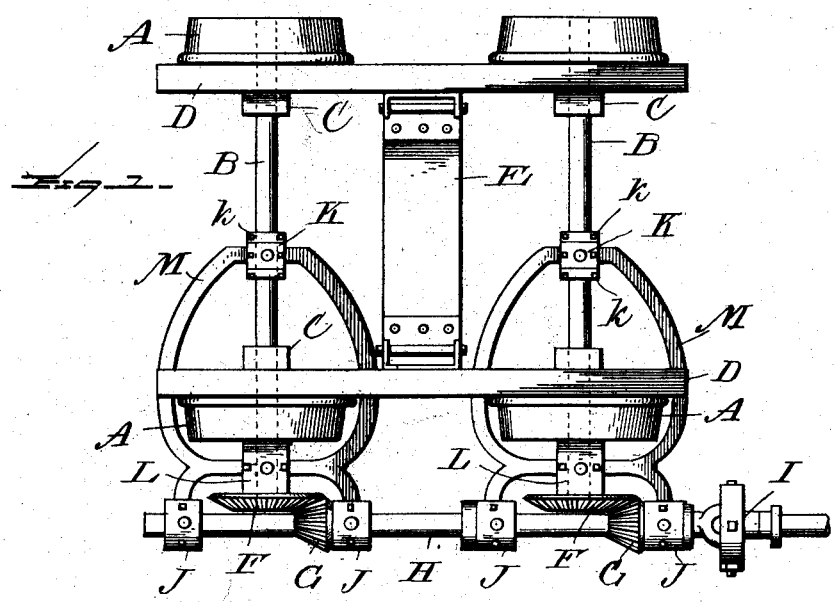
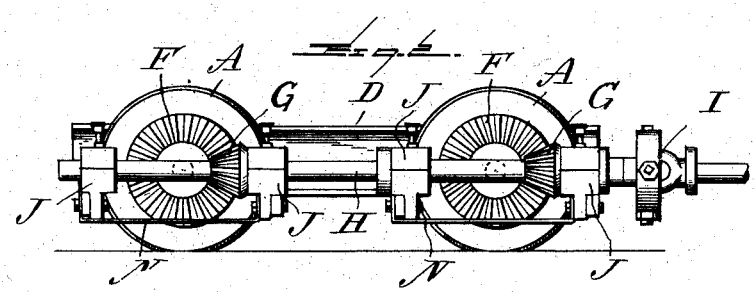
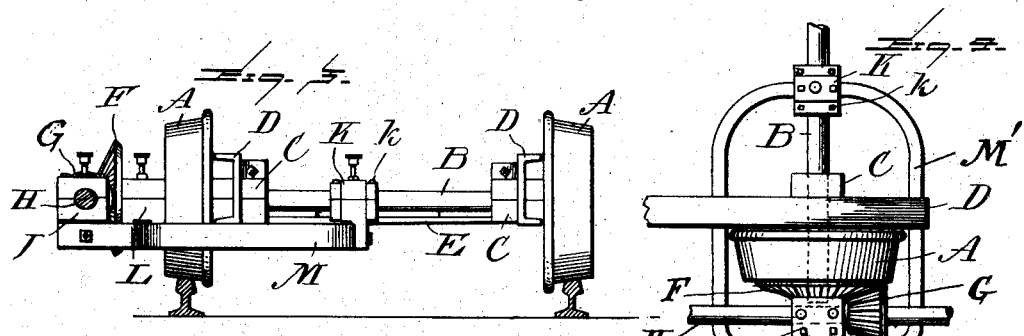
WITNESSES:
Wm. F. Doyle
Osgood W. Orwell
INVENTOR
Ephraim Shay
BY Julian A. Dowell
his Attorney
THE NORRIS PETERS CO., PHOTO-LITHO., WASHINGTON, D. C.

UNITED STATES PATENT OFFICE.

EPHRAIM SHAY, OF HARBOR SPRINGS, MICHIGAN.

LOCOMOTIVE-TRUCK.

SPECIFICATION forming part of Letters Patent No. 706,604, dated August 12, 1902.

Application filed April 8, 1902. Serial No. 101,905. (No model.)

*To all whom it may concern:*

Be it known that I, EPHRAIM SHAY, a citizen of the United States, residing at Harbor Springs, in the county of Emmet and State of Michigan, have invented certain new and useful Improvements in Locomotive-Trucks; and I do hereby declare the following to be a full, clear, and exact description of the invention, such as will enable others skilled in the art to which it appertains to make and use the same.

This invention relates to trucks for locomotives of that type in which power is transmitted from the piston of the engine to the driving-wheels through the medium of a longitudinal driving-shaft and bevel-gears or other connections, an example of which is illustrated and described in United States Letters Patent No. 242,992, issued to me on June 14, 1881.

The principal objects of my present invention are to maintain the bevel-gears on the driving-shaft and driver-axles in proper relation notwithstanding the changing positions of the driver-axles as the wheels or drivers pass over irregular and uneven track and to relieve the journal-boxes holding the gears in mesh from the weight of the locomotive and consequent thrust and wear.

The invention will hereinafter be first fully described with reference to the accompanying drawings, which form a part of this specification, and then more particularly pointed out in the following claims.

In said drawings, in which corresponding parts in the several views are designated by the same reference characters, Figure 1 is a top plan view of a locomotive-truck embodying my invention. Fig. 2 is a side elevation thereof. Fig. 3 is an end elevation; and Fig. 4 is a fragmentary plan view of a portion of a truck of different construction, illustrating a modification of the invention.

The truck illustrated has four wheels, both pairs of which constitute locomotive-drivers; but it will be understood that my invention is independent of the particular style of truck and number of wheels and drivers.

The letter A designates the wheels or drivers, and B denotes the driver-axles. The axles are journaled in suitable bearings or boxes C, which, as shown, are secured to equalizing side bars D, connected by a central brace E. The said side bars, brace, and journal-boxes constitute the frame of the truck, upon which are mounted the usual bolster or bolsters (not shown) which support the weight of the locomotive.

In the construction illustrated in Figs. 1, 2, and 3 the driver-axles extend through or beyond the wheels at one side of the truck and are provided with bevel-gears F, rigidly secured thereon, which mesh with similar bevel-pinions G on the longitudinal driving-shaft H of the locomotive. Gears F may be keyed to the axle or bolted to a fixed hub on the axle, the latter arrangement being preferred, since it allows repairs to be made more readily. The said shaft H is driven by suitable connection (not shown) with the piston of the engine, and thus transmits power to the drivers through the bevel-gearing F and G. As explained in the specification of my aforesaid patent, the driving-shaft is preferably composed of separate sections united by universal joints or couplings, as at I, for the purpose of compensating for curved, irregular, or uneven track and preventing bending, improper straining, and injury to the driving-shaft.

In order to maintain the bevel-gearing F and G in proper relation at all times notwithstanding the changing positions of the axles as the wheels or drivers pass over irregular or uneven track, the driving-shaft is preferably journaled at opposite sides of each set of said bevel-gearing in suitable boxes J, which are rigidly secured to and supported by a bridle frame or yoke M, which latter is rigidly secured to boxes K and L, mounted on the corresponding driver-axle. The box K is mounted substantially midway or at any other desired position between the wheels or on the opposite end of the axle and maintained in such position by collars $k$ or other suitable means, and the box L is mounted between the driver and the bevel-gear F. The said boxes J, K, and L are arranged in accurate axial relation, and consequently the gears F and G are caused to mesh perfectly at all times, thus preventing twisting and injury to the gear-teeth, undue strain of the parts, and loss of power. A brace and guard N is preferably secured between the boxes J to prevent movement thereof and increase the strength and rigidity of the structure, to guard the gears from dust or contact with foreign bodies on the track, and to prevent grasses or weeds from brushing against the gears, wiping off the oil, and imparting dust or grit thereto.

The bridle-frame consists, preferably, of an integral casting of steel or other metal and may be formed integrally with or rigidly secured to the boxes in any suitable manner. As shown, Figs. 2 and 3, said boxes are formed with flat-sided lugs or projections depending from their lower members, and the frame is bolted sidewise to said lugs.

The bridle-frame shown in Fig. 1 comprises a curved or elliptical main body bolted to the boxes K and L and inclosing the driving-wheel and having outer integral or rigid arms or yoke members bolted to the boxes J to support the driving-shaft. It will be understood, however, that the frame may be of any suitable form and construction, according to the construction of the truck and relative arrangement of the driving-shaft, axles, and gearing.

In the modified construction (represented in part in Fig. 4) the bevel-gear F is secured directly to the wheel or driver and the box L is omitted. The driving-shaft H and also the outer end of the driver-axle are both journaled in a single double box J', bolted or secured to a bridle frame or yoke M', which passes around the wheel and is secured to the box K, mounted on the driver-axle.

In some instances the sides of the bridle-frame may be in the form of arches and pass over the side bars D, though the constructions illustrated or similar constructions are preferred for the purposes of strength, simplicity, and lightness.

The invention is adaptable for use with other types of gearing—as, for instance, screw-and-pinion gearing—and is also susceptible of various modifications in details of construction and arrangement without departing from the scope thereof.

Having thus fully described my invention, what I claim, and desire to secure by Letters Patent of the United States, is—

1. In a truck for locomotives of the character described, the combination with the longitudinal driving-shaft, driving-wheels and axle, and intermeshing gears on said shaft and axle, of a rigid bridle-frame mounted on said axle having bearings at opposite sides of the gears in which the shaft is journaled and supported, substantially as described.

2. In a locomotive-truck, the combination with drivers and axle, a longitudinal driving-shaft at the side of the truck, and intermeshing gears on said shaft and axle, of a rigid frame or structure in which the driving-shaft is journaled inclosing the adjacent driver and mounted on the axle at opposite sides of said driver, substantially as described.

3. In a locomotive-truck, the combination with the drivers and axle, a longitudinal driving-shaft disposed at the side of the truck, and intermeshing gears on said shaft and axle, of a journal-box mounted in fixed position on the axle intermediate the drivers, a box mounted on the axle between said gearing and adjacent driver, a bridle-frame inclosing said driver and rigidly secured to said boxes, and similar boxes in which the driving-shaft is journaled secured to and supported by said bridle-frame; substantially as described.

4. In a locomotive-truck, the combination with the drivers and axle, a longitudinal driving-shaft disposed at the side of the truck, and intermeshing gears on said shaft and axle, of journal-boxes mounted on the axle at opposite sides of the driver, a bridle-frame inclosing said driver and rigidly secured to said boxes, said frame having outwardly-extending yoke-arms, and boxes at opposite sides of the gears in which the driving-shaft is journaled secured to and supported by said arms; substantially as described.

5. In a locomotive-truck, the combination with drivers and axle, a longitudinal driving-shaft, and intermeshing gears on said shaft and axle, of a rigid structure mounted on the axle and having bearings at opposite sides of the gears in which the driving-shaft is journaled, and a guard secured to said bearings beneath the gears, substantially as described.

6. In a locomotive-truck, the combination with a number of axles and drivers, of a longitudinal driving-shaft, intermeshing gears on said shaft and axles, and rigid structures mounted on each of the driver-axles at opposite sides of one set of drivers having bearings in which the shaft is journaled, said structures thereby fully supporting the shaft, substantially as described.

In testimony whereof I affix my signature in presence of two witnesses.

EPHRAIM SHAY.

Witnesses:
 WM. H. LEE,
 JAMES WHITE.